United States Patent [19]

Tenjinbayashi

[11] Patent Number: 4,693,604
[45] Date of Patent: Sep. 15, 1987

[54] INTERFERENCE METHOD AND INTERFEROMETER FOR TESTING THE SURFACE PRECISION OF A PARABOLIC MIRROR

[75] Inventor: Koji Tenjinbayashi, Ibaraki, Japan

[73] Assignees: Agency of Industrial Science & Technology; Ministry of International Trade and Industry, both of Tokyo, Japan

[21] Appl. No.: 762,944

[22] Filed: Aug. 6, 1985

[30] Foreign Application Priority Data

Aug. 6, 1984 [JP] Japan .................................. 59-164661

[51] Int. Cl.$^4$ ............................................. G01B 9/021
[52] U.S. Cl. ...................................... 356/348; 356/360
[58] Field of Search ................. 356/347, 348, 359, 360

[56] References Cited
PUBLICATIONS

Hildebrand, "A Holographic Instrument to Replace the Test Glass in Lens Testing", *Optical Engineering*, vol. 15, No. 1, pp. 24–28, 2/76.

Primary Examiner—Davis L. Willis
Assistant Examiner—Matthew W. Koren
Attorney, Agent, or Firm—Schwartz & Weinrieb

[57] ABSTRACT

An interference method of testing the surface precision of a parabolic mirror comprising the steps of dividing a beam of light rays into two beams, converting these beams into divergent spherical light waves by means of microscope object lenses, illuminating the parabolic mirror with one of the divided beams of light rays, producing a standard light from the other divided beam of light rays, and causing the reflected light from said parabolic mirror to interfere with the standard light.

14 Claims, 7 Drawing Figures

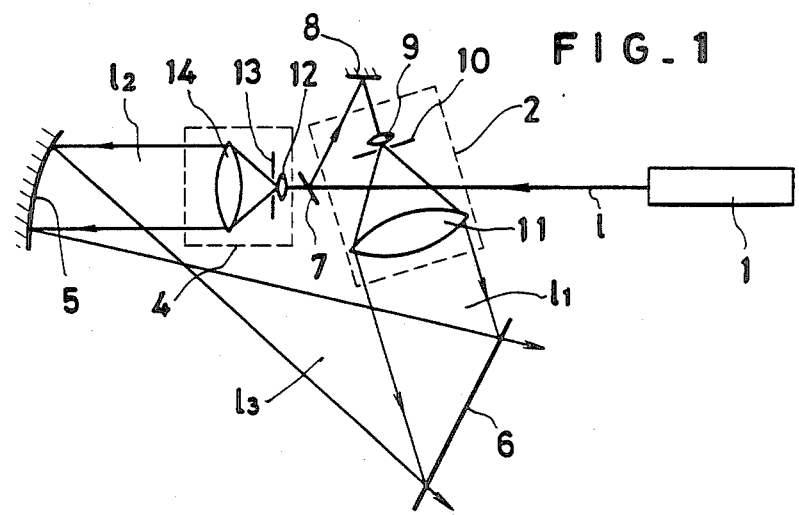
FIG_1
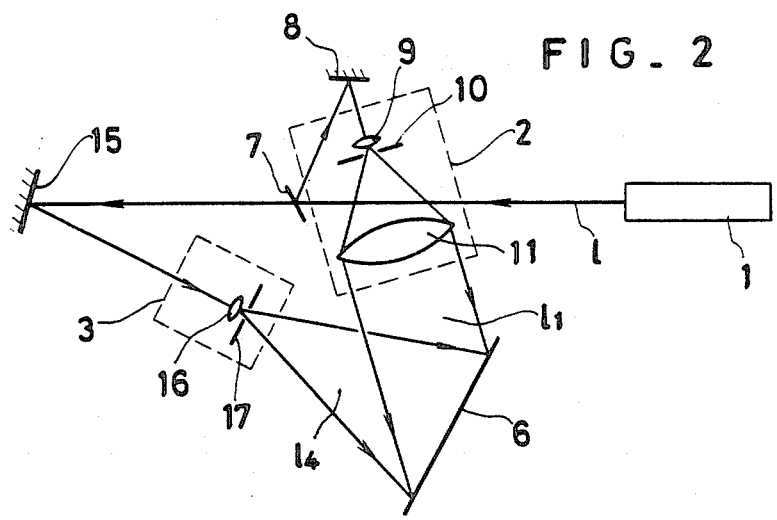
FIG_2
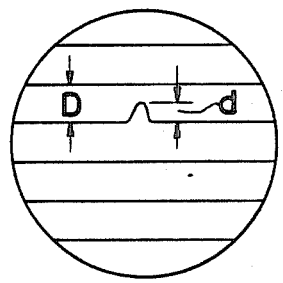
FIG_3

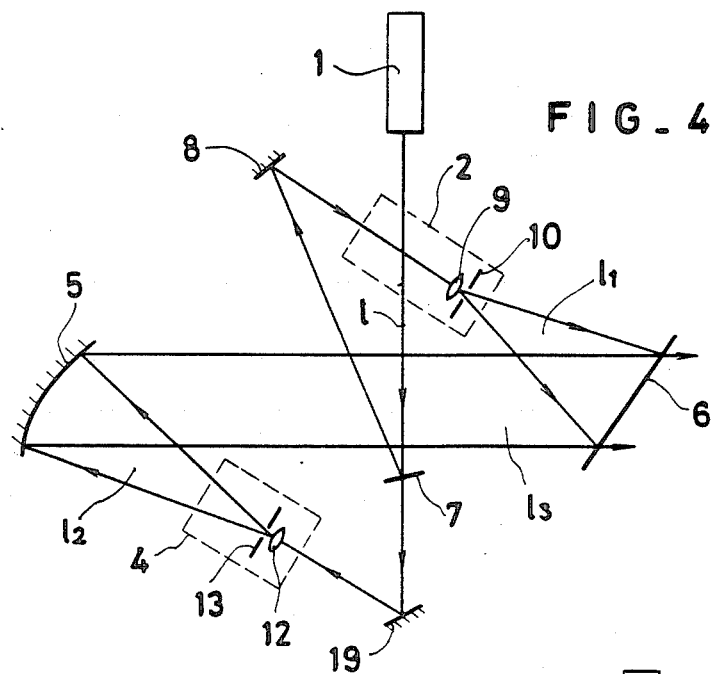
FIG_4
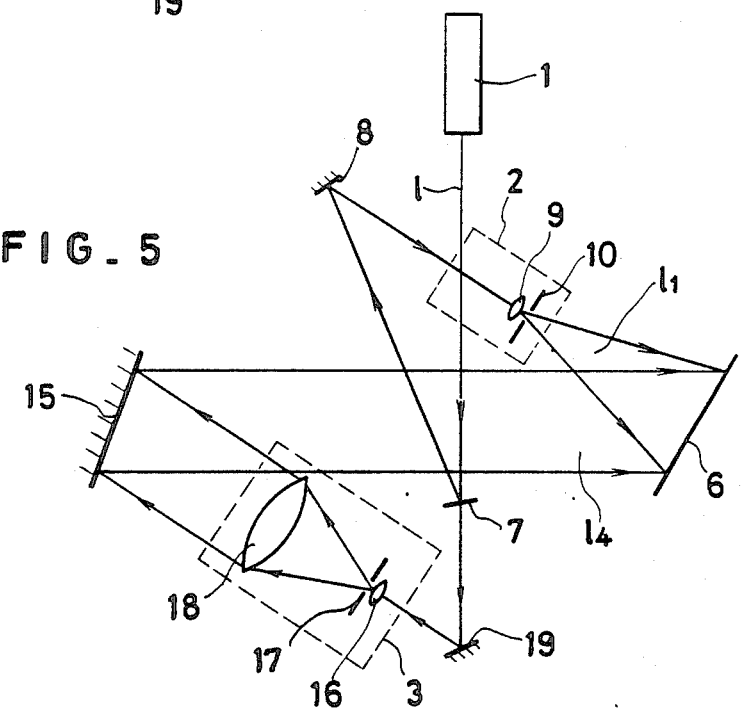
FIG_5

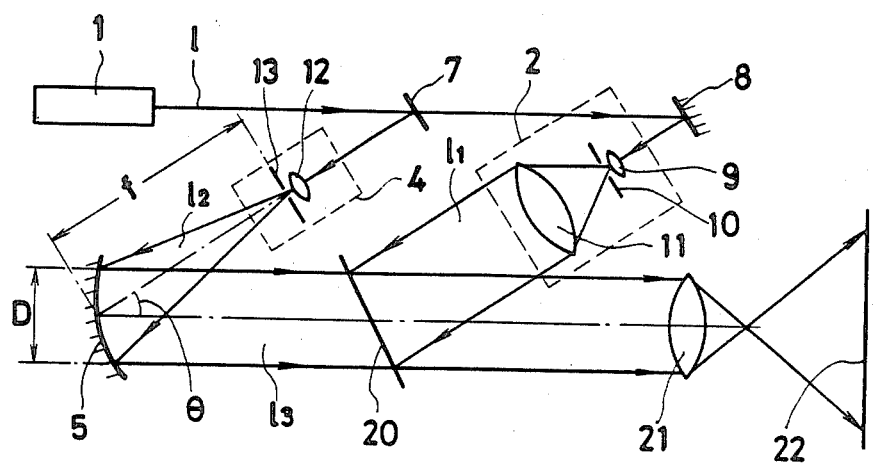
FIG_6
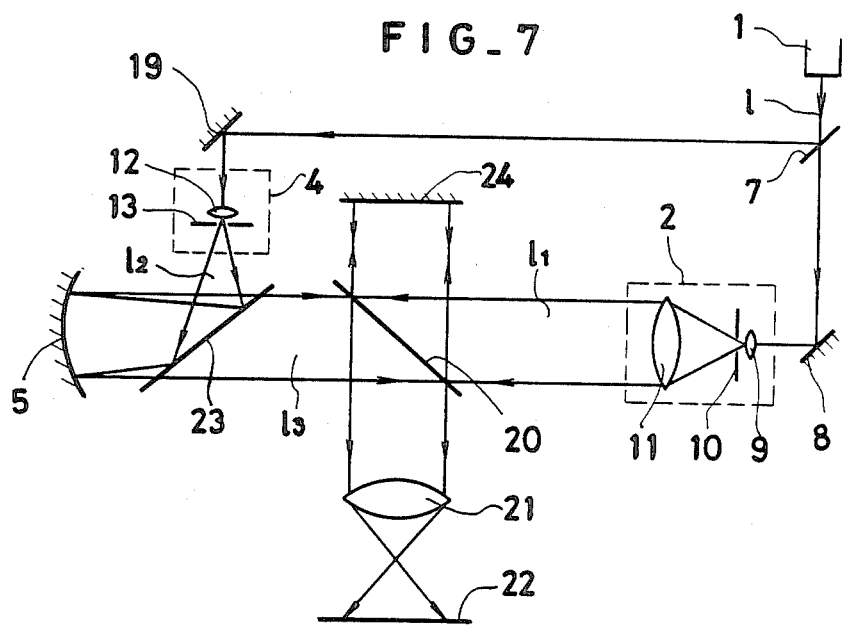
FIG_7

INTERFERENCE METHOD AND INTERFEROMETER FOR TESTING THE SURFACE PRECISION OF A PARABOLIC MIRROR

BACKGROUND OF THE INVENTION

1. Field of the Invention

The present invention relates to an interference method and an interferometer for testing the surface precision of a parabolic mirror.

2. Description of the Related Art

A parabolic mirror is a useful optical unit which can be used for the purpose of converging collimated light rays towards a single point within or out of the incident optical path on which they travel towards the unit without aberration, and for the purpose of collimating spherical light rays diverging from a single point and directing the collimated light rays within or out of the incident optical path. Parabolic mirrors are used, for example, as a converging mirror in laser apparatus, such as are used in nuclear fusion devices or for laser machining purposes. In general, the precision with which the surface of a parabolic mirror which has been ground or finished is tested by directing a beam of collimated light rays onto the parabolic mirror and by measuring the size of the focal point to which the collimated light rays converge. Then, the surface precision of the parabolic mirror is determined in terms of the focal point thus measured. The surface precision increases with the decrease of the focal point, which can be used as the figure of merit. However, this testing method measures, in fact, the capability of converging light rays rather than the precision with which a parabolic mirror surface has been shaped. For another example of a testing method, a knife edge is disposed at a point at which light rays converge, and the surface precision is determined in terms of the brightness and darkness of an image. This method, however, is qualitative rather than quantitative in nature.

Another testing method uses a computer to produce a hologram, but it has not been practically used because of the complexity of forming such a hologram.

Still another testing method uses a spherical wave which is closest to the parabolic surface of a mirror to be tested. The surface precision of the mirror is determined by measuring the positions of interference fringes resulting from interference between the spherical wave and one reflected from the mirror. The analysis of interference fringes, however, is very troublesome, also requiring much time and work.

OBJECTS AND SUMMARY OF THE INVENTION

One object of the present invention is to provide an interference method for testing the surface precision of a parabolic mirror with ease and exactitude.

Another object of the present invention is to provide an interferometer for testing the surface precision of a parabolic mirror with ease and exactitude.

To attain these objects an interference testing method according to the present invention comprises the steps of: dividing a beam of light rays from a laser light source into two beams by means of a beam splitter; transforming these beams of light rays into divergent spherical waves by means of microscope object lenses; directing one of these light beams (illuminating light beam) to the parabolic mirror; and allowing the illuminating light beam reflecting from the parabolic mirror to interfere with the other light beam (reference light beam), thus causing interference fringes to appear.

The illuminating and reference light beams are converted to collimated light and made to interfere with each other at an angle, which causes interference fringes to appear perpendicularly to the plane including the axes of the two beams. In the case of a perfect parabolic mirror surface, the interference fringes will be linear but when there are irregularities in the parabolic mirror surface, the interference fringes will also be irregular. As a result, it is possible to evaluate the mirror surface.

BRIEF DESCRIPTION OF DRAWINGS

The above and other objects and advantages of the present invention will be better understood from the following description of the preferred embodiments with reference to the accompanying drawings:

FIG. 1 is a structural diagram showing an interferometer for testing the precision with which a parabolic mirror surface has been formed according to one embodiment of the present invention;

FIG. 2 is a structural diagram of an optical system for producing a hologram which is to be used in the interferometer of FIG. 1;

FIG. 3 shows interference fringes formed by an interferometer according to the present invention;

FIG. 4 is a structural diagram of a modification of an interferometer of FIG. 1;

FIG. 5 is a structural diagram of an optical system for producing a hologram which is to be used in an interferometer of FIG. 4;

FIG. 6 is a structural diagram of an interferometer according to another embodiment of the present invention; and FIG. 7 is a structural diagram of a modification of an interferometer of FIG. 6.

DESCRIPTION OF PREFERRED EMBODIMENTS

FIG. 1 shows an interferometer according to a first embodiment of the present invention using a hologram.

Within FIG. 1, an interferometer comprises a laser light source 1, for instance a He-Ne or argon laser, a reference optical system 2, an illuminating optical system 4, a hologram 6, and a beam splitter 7. The reference optical system 2 is composed of a reflector mirror 8, a microscope object lens 9, means defining a pinhole 10 and a collimator lens 11. The beam splitter 7 functions to divide a beam of light rays l from the laser 1 into two beams of light rays. One of these beams of light rays then falls on the hologram 6 as a reference light beam $l_1$.

As shown in the drawing, the illuminating system 4 is composed of a microscope object lens 12, means defining a pinhole 13 and a collimator lens 14. The other beam of light rays is converted into a divergent spherical light beam pattern by the microscope lens 12 and the pinhole 13, and is then converted into a collimated light beam pattern $l_2$ by the collimator lens 14. The collimated light beam pattern $l_2$ travels to the parabolic mirror surface 5 which is situated on the optical axis of the lens 14.

With this arrangement the interferometer may test the surface precision of a parabolic mirror as follows:

A beam of light rays l from the laser light source 1 is divided into two beams of light rays by the beam splitter 7. One of these two beams of light rays is reflected by the reflector mirror 8 and directed to the reference optical system 2 in which it is converted into a divergent spherical light wave by means of the microscope object lens 9 and the pinhole 10; and then the divergent spherical light wave is converted into collimated light by means of the collimator lens 11. This collimated light falls on the hologram as a reference light beam pattern $l_1$. The other beam of light rays is directed to the illuminating system 4, in which it is converted into a divergent spherical light wave by means of the microscope object lens 12 and the pinhole 13; and then the divergent spherical light wave is converted into collimated light by the collimator lens 14. The collimated light beam pattern $l_2$ falls on the parabolic mirror 5. Again, it is converted into a divergent spherical light wave $l_3$ when reflected by the parabolic mirror surface 5. Then, it falls on the hologram 6 at which the reference light beam $l_1$ and the divergent spherical light wave $l_3$ meet.

In the hologram 6 is recorded an object light which forms a standard (divergent spherical light wave) (FIG. 2). Interference fringes appear perpendicularly to the plane including the axes of the two beams. If the parabolic mirror has a perfect parabolic shape, the divergent spherical light $l_3$ reflected by the parabolic mirror surface 5 is in exact registration with the standard spherical light wave recorded on the hologram, thus causing a plurality of linear interference fringes to appear on the screen. Otherwise, if the parabolic mirror 5 has a less precise parabolic shape, some irregularities appear in the interference fringes at positions corresponding to defective parts of the parabolic mirror surface as shown in FIG. 3. The parabolic shaping error $\Delta h$ at the center of the most sensitive part of the in-axis parabolic mirror surface is given by the following equation:

$$\Delta h = (d/D) \cdot (\lambda/2) \qquad (1),$$

where "d" stands for the amount of deviation; "D" stands for pitch; and "λ" stands for wavelength.

The parabolic shaping error $\Delta h$ at a given measuring point of the off-axis parabolic mirror surface is given by the following equation:

$$\Delta h = (m) \cdot \lambda / (1 + \cos \theta) \qquad (2),$$

where "m" is an integer which stands for the order of interference fringes and "θ" stands for an angle which the incident light forms with the reflected light at a given measuring point in the parabolic mirror surface. This angle varies with the position of point P.

FIG. 2 shows the structure of an optical arrangement for recording an object light of divergent spherical light wave as a standard in a hologram. As seen from the drawing, it is similar to the interferometer of FIG. 1 except for an object optical system 3 in place of the illuminating optical system 4 in FIG. 1. The object optical system 3 is composed of a microscope object lens 16 and means defining a pinhole 17. In producing a hologram, a beam of light rays from the laser light source 1 is divided into two beams of light rays by the beam splitter 7. One of these light beams reflects from the reflector mirror 8 and is directed to the reference optical system 2. It falls on the microscope object lens 9 and the pinhole 10, thereby converting the same into a divergent spherical light wave. Then, it passes through a collimator lens 11 so as to convert it into a collimated light beam, which is used as a reference light $l_1$. The other beam of light rays, after reflecting from a reflector mirror 15, travels to the object optical system 3, in which it is directed to the microscope object lens 16 and the pinhole 17, thus converting the same into an object light of divergent spherical light wave $l_4$. This object light $l_4$ along with the reference light $l_1$ are recorded on a photo-sensitive plate when exposed to the light beams, thus providing a hologram as required.

As may be understood from the above, the present invention utilizes a small-diameter, aberration-free microscope object lens to provide a divergent spherical light wave to a parabolic mirror to be tested. The surface precision of the parabolic mirror is determined from the interference fringes appearing as a result of the interference between the standard light and the light reflecting from the parabolic mirror surface. Such object lenses as used in a tool maker's microscope or metallographic microscope may be used in the interferometer according to the present invention. Parabolic mirror surfaces of different focal lengths or different off-axis angles may be tested simply by controlling the position of the microscope object lenses in the interferometer. Also, parabolic mirror surfaces of different sizes may be tested simply by using lenses of different magnifications.

FIG. 4 shows a modification of the interferometer of FIG. 1, using a divergent spherical light as a reference light, and collimated light as an illuminating source of light.

The interferometer of FIG. 4 is composed of a laser light source 1, a reference light optical system 2, an illuminating light optical system 4, a hologram 6 and a beam splitter 7, as is the case with the interferometer of FIG. 1. The illuminating optical system 4 and the structure of the hologram 6 are somewhat different from those of the interferometer of FIG. 1. Namely, the illuminating optical system 4 is composed of a microscope object lens 12 and means defining a pinhole 13, using no collimator lens. A parabolic mirror surface 5 is disposed in such a position on the optical axis of the microscope object lens 12 that a divergent spherical light wave is impressed upon the parabolic mirror surface 5 so as to provide a collimated light $l_3$ as a reflection light pattern.

The hologram 6 is formed by using collimated object light. FIG. 5 shows an optical system for forming a hologram as required. As shown, it has an object optical system 3 in place of the illuminating optical system 4 of FIG. 4. The object optical system 3 is composed of a microscope object lens 16, means defining a pinhole 17, and a collimator lens 18 on the optical axis of the system. It functions to form a hologram 6 as follows: A beam of light rays 1 from the laser light source 1 is divided into two beams by a beam splitter 7. One of these light beams is directed to the reference optical system 2 by the reflector mirror 8, and is then converted to a divergent spherical light wave by the microscope object lens 9 and the pinhole 10. The other light beam is reflected by a reflector mirror 19 so as to travel to the object optical system 3. In the object optical system 3 it is converted into a divergent spherical light wave by the microscope object lens 16 and means defining the pinhole 17. Again, it is converted into collimated light by the collimator lens 18, and the collimated light is reflected by the reference plane mirror 15. The collimated object light $l_4$ along with the reference light $l_1$ are directed onto a photosensitive plate. Then, the photosensitive plate is subjected to a developing so as to provide a hologram 6 as required.

The hologram 6 is positioned where the illuminating light l₃ and the reference light l₁ meet each other as shown in FIG. 4. A parabolic mirror surface to be tested is positioned in place of the reference plane mirror 15.

The interferometer of FIG. 4 tests the surface precision of a parabolic mirror 5 as follows.

A beam of light rays l from the laser light source 1 is divided into two beams by the beam splitter 7. One of these light beams is directed to the reference optical system 2 so as to provide a divergent spherical light wave $l_1$ to the hologram 6 as a reference light beam. When it falls on the hologram 6, a collimated object light is regenerated from the hologram 6. The other light beam is directed to the illuminating optical system 4 so as to generate a divergent spherical light wave of illuminating light $l_2$, which is converted into a collimated light beam $l_3$ when reflected from the parabolic mirror surface 5. Finally, it falls on the hologram 6 and then interferes with the collimated object light $l_1$ regenerated in situ so as to form interference fringes. The surface precision of the parabolic mirror can be determined from the interference fringes thus formed.

As understood from the above, this particular embodiment uses a regenerated light beam and an illuminating light beam, both of which are collimated light, in contrast to the interferometer of FIG. 1 which uses a collimated reference light beam and a divergent spherical light wave of illumination.

FIG. 6 shows an interferometer according to a second embodiment of the present invention using no hologram.

The interferometer is shown as comprising a laser light source 1 such as a He-Ne or argon laser, a beam splitter 7, a reference optical system 2, an illuminating optical system 4, a second beam splitter 20, an observation lens 21 and a screen 22.

The reference optical system 2 is composed of a microscope object lens 9, means defining a pinhole 10 and a collimator lens 11.

On the other hand, the illuminating optical system 4 is composed of a microscope object lens 12 and means defining a pinhole 13.

The interferometer tests the surface precision of a parabolic mirror surface as follows.

A beam of light rays l from the laser light source 1 is divided into two beams by the beam splitter 7. One of these light beams is converted into a divergent spherical light wave $l_2$ by means of the microscope object lens 12 and the pinhole 13, and the divergent spherical light wave is directed to the parabolic mirror surface 5. The parabolic mirror surface 5 is disposed in a certain direction which is determined from the off-axis angle "θ" and the focal length "f" of the parabolic mirror. Thus, the wave front of the divergent spherical light wave $l_3$ reflected by the parabolic mirror surface 5 is fairly close to a plane wave. On the other hand, the other light beam passing through the beam splitter 7 is reflected by the beam reflector 8, and is then converted to a divergent spherical light wave by the microscope object lens 9 and the pinhole 10 in the reference optical system 2. Finally, it is converted into a plane wave $l_1$ by the collimator lens 11.

This plane wave $l_1$ is reflected by a half mirror 20 so as to be superimposed upon the plane wave $l_2$ mentioned above, and together they pass through the observation lens 21 so as to reach the screen 22. The parabolic mirror surface has not been subjected to fine positional adjustment, and therefore many interference fringes may appear on the screen 22. These interference fringes may be reduced to a possible minimum by controlling the inclination and position of the parabolic mirror 5. If the parabolic mirror surface is perfect in shape, the interference pattern shows a plurality of interference fringes at regular intervals ($\lambda/2$; $\lambda=0.633$ μm). Otherwise, if the parabolic mirror surface is not perfect in shape or is not properly positioned, the reflected light $l_3$ has uneven components, and the resultant interference fringes appearing on the screen show unevenness at the places corresponding to the uneven parts of the parabolic mirror surface, as shown in FIG. 3.

The shaping error $\Delta h$ of the parabolic mirror surface can be determined from the pitch "D" of adjacent interference fringes and the deviation "d" according to equations 1 and 2 for the center or most sensitive part of the in-axis parabolic mirror surface and for a given part of the off-axis parabolic mirror surface, respectively.

FIG. 7 shows a modification of the interferometer of FIG. 6. Specifically, it is designed appropriately for the purpose of testing the surface precision of an in-axis parabolic mirror. As shown in the drawing, a half mirror 23 is placed at the outlet of an illuminating optical system 4 and on the optical axis of an in-axis parabolic mirror 5 to be tested, thereby directing the divergent spherical light wave from the illuminating optical system 4 towards the parabolic mirror 5. Then, the reflected light $l_3$ from the parabolic mirror 5 passes through the half mirror 23 so as to reach the beam splitter 20. In a similar way to the interferometer of FIG. 6 the reflected light $l_3$ interferes with the collimated light $l_1$, and interference fringes appear if the parabolic mirror surface is partly uneven.

According to the present invention, as described above, the surface precision of a parabolic mirror can be tested with ease and exactitude by the use of an aberration-free microscope object lens without requiring the adoption of either a standard parabolic mirror or a high-precision aspheric object lens, and it is possible to inexpensively manufacture an interferometer with ease. Further, since the surface of any kind of f-number parabolic lens can be evaluated with precision merely by replacing a microscope object lens with another or moving the parabolic lens surface from one microscope object lens to another, the present invention can provide extensive utility relative to the objects being measured.

Obviiusly, many modifications and variations of the present invention are possible in light of the above teachings. It is therefore to be understood that within the scope of the appended claims, the present invention may be practiced otherwise than as specifically described herein.

What is claimed is:

1. An interference method of testing the surface precision of a parabolic mirror, comprising the steps of:
    dividing a beam of light rays from a laser light source into two beams of light by means of a beam splitter;
    producing an illuminating light beam by converting one of said two beams of light into a divergent spherical light wave by means of a microscope object lens and an associated pinhole;
    producing a reference light beam from the other one of said two light beams;
    illuminating a parabolic mirror to be tested with said illuminating light beam;

causing reflected light from said parabolic mirror to interfere with said reference light beam so as to thereby form interference fringes; and determining any shaping error of said parabolic mirror from said interference fringes.

2. An interference method according to claim 1, further comprising the steps of:

directing said reference beam onto a hologram having a standard object light stored therein so as to regenerate said standard object light from said hologram; and causing said regenerated object light to interfere with said reflected light from said parabolic mirror.

3. An interference method as set forth in claim 1, wherein:

said reference light beam is produced from said other one of said two light beams by converting said other one of said two light beams into a divergent spherical light wave by means of a microscope object lens and an associated pinhole and then converting said divergent spherical light wave into a collimated light beam by means of a collimator.

4. A method as set forth in claim 1, additionally comprising the step of:

converting said divergent spherical light wave into a collimated light beam by means of a collimator.

5. An interferometer for testing the surface precision of a parabolic mirror comprising:

a laser light source;

a beam splitter for dividing a beam of light rays from said laser light source into two beams of light;

an illuminating optical system, including a microscope object lens and a pinhole, for converting one of said two beams of light into a divergent spherical light wave;

a reference optical system for converting the other one of said two beams of light into a reference beam;

means for conducting said divergent spherical light wave onto said parabolic mirror so as to cause said divergent spherical light wave to reflect from said parabolic mirror; and means for causing said reflected light from said parabolic mirror to interfere with said reference light beam so as to thereby form interference fringes.

6. An interferometer according to claim 5, wherein said illuminating optical system further comprises:

a collimator lens for converting said divergent spherical light wave into collimated light which is caused to be reflected from said parabolic mirror.

7. An interferometer as set forth in claim 5, further comprising:

a hologram, having a standard object light stored therein, disposed at the intersection of said reflected light reflected from said parabolic mirror and said reference light beam.

8. An interferometer according to claim 7, wherein said reference optical system is composed of a microscope object lens and an associated pinhole for converting said other one of said two beams of light into a divergent spherical light wave which falls upon said hologram so as to regenerate said standard object light from said hologram, and means for causing said regenerated object light to interfere with said reflected light reflected from said parabolic mirror.

9. An interferometer according to claim 7, wherein said reference optical system is composed of:

a microscope object lens, an associated pinhole, and a collimator lens, for initially converting said other one of said two beams of light into a divergent spherical light wave and subsequently into collimated light, and for illuminating said hologram with said collimated light so as to regenerate said standard object light in situ within said hologram so as to interfere with said reflected light reflected from said parabolic mirror.

10. An interferometer as set forth in claim 5, wherein:

said reference optical system comprises a microscope object lens and an associated pinhole, and a collimator lens, for initially converting said other one of said two beams of light into a divergent spherical light wave and subsequently into collimated light.

11. An interferometer for testing the surface precision of a parabolic mirror, comprising:

a laser light source;

a beam splitter for dividing a beam of light rays from said laser light source into two beams of light;

an illuminating optical system, including a microscope object lens and a pinhole, for converting one of said two beams of light into a divergent spherical light wave;

a reference optical system for converting the other one of said two beams of light into a reference beam;

a hologram having a standard object light stored therein;

means for directing said reference light beam onto said hologram so as to regenerate said standard object light from said hologram;

means for conducting said divergent spherical light wave onto said parabolic mirror so as to cause said divergent spherical light wave to be reflected from said parabolic mirror;

said hologram is disposed at the intersection of said reflected light reflected from said parabolic mirror and said reference light beam; and means for directing said reflected divergent spherical light wave from said parabolic mirror onto said hologram so as to interfere with said reference light beam so as to thereby form interference fringes.

12. An interferometer according to claim 11 wherein:

said illuminating optical system further comprises a collimator lens for converting said divergent spherical light wave into a collimated light beam.

13. An interferometer according to claim 11, wherein:

said reference optical system is composed of a microscope object lens and an associated pinhole for converting said other one of said two beams of light into a divergent spherical light wave.

14. An interferometer according to claim 11, wherein:

said reference optical system is composed of a microscope object lens, an associated pinhole, and a collimator for thereby initially converting said other one of said two beams of light into a divergent spherical light wave and subsequently converting said divergent spherical light wave into a collimated light beam.

* * * * *